W. & T. P. CARR.
Grain-Meter.
No. 221,518. Patented Nov. 11, 1879.
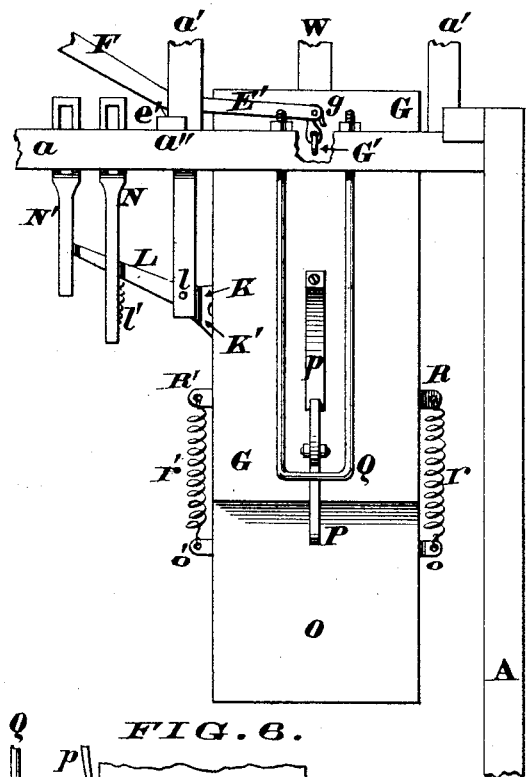
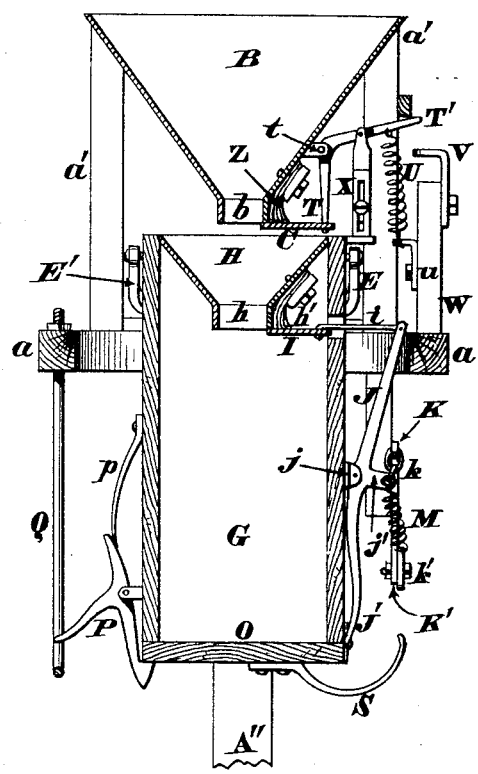
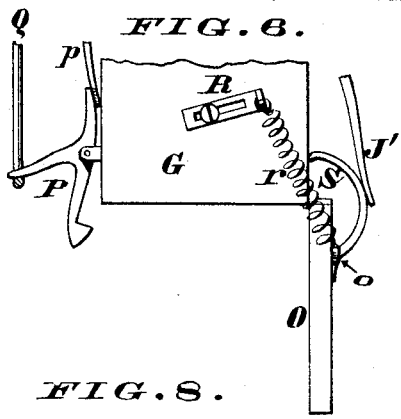
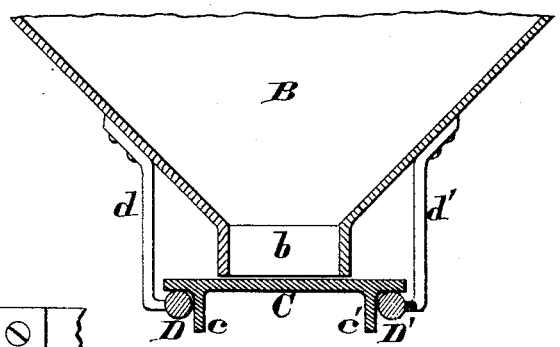
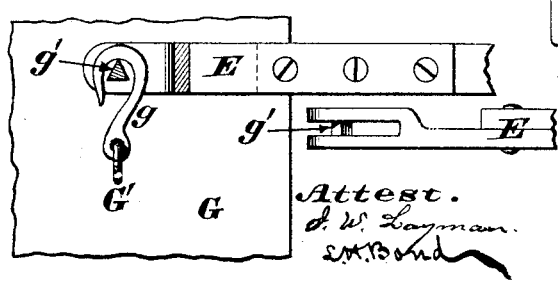

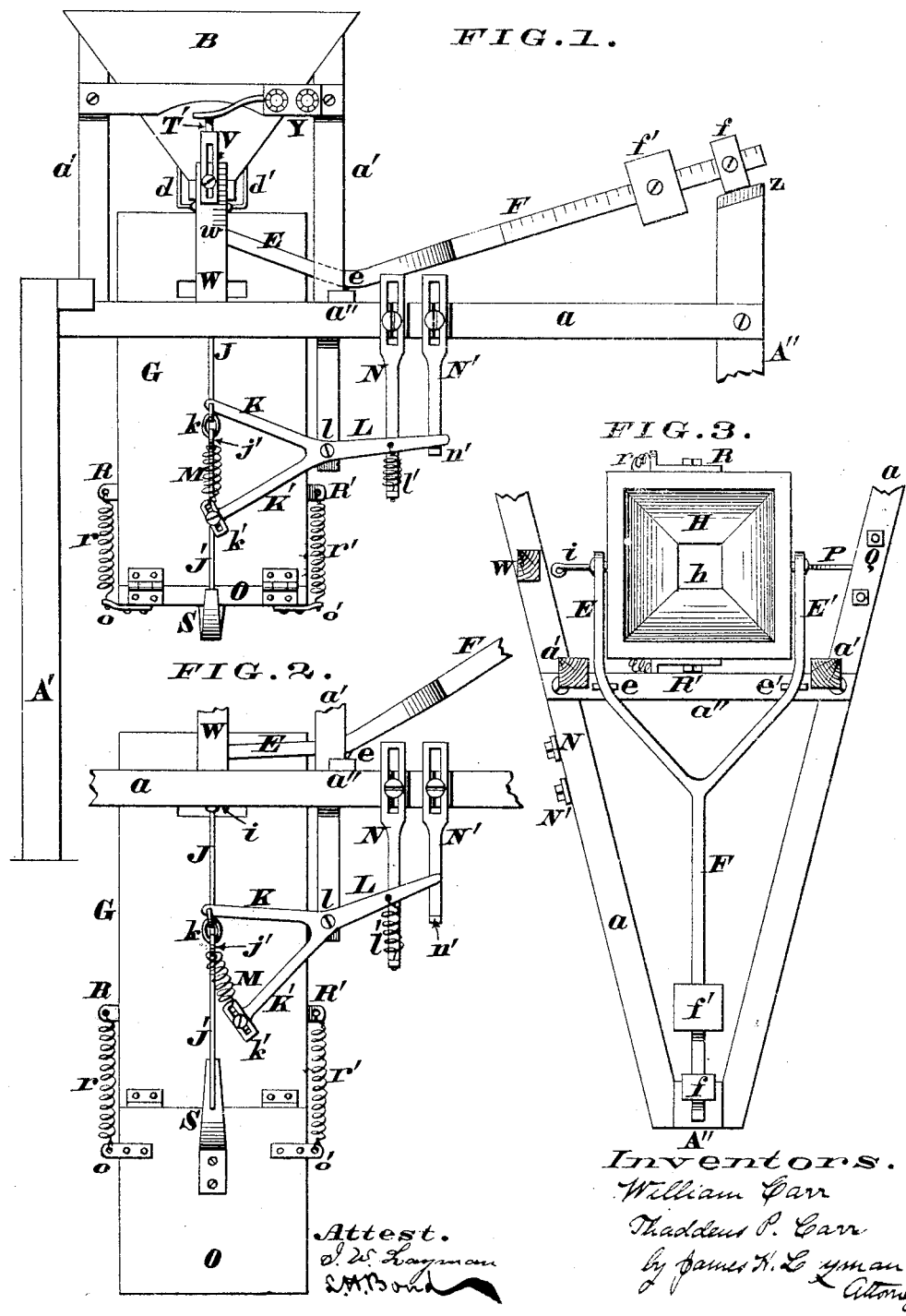

UNITED STATES PATENT OFFICE.

WILLIAM CARR AND THADDEUS P. CARR, OF YELLOW SPRINGS, OHIO.

IMPROVEMENT IN GRAIN-METERS.

Specification forming part of Letters Patent No. 221,518, dated November 11, 1879; application filed June 9, 1879.

*To all whom it may concern:*

Be it known that we, WILLIAM CARR and THADDEUS P. CARR, both of Yellow Springs, Greene county, Ohio, have invented certain new and useful Improvements in Grain-Meters, of which the following is a specification.

Our improvements relate more particularly to certain peculiarities in the construction of those grain-meters which are suspended from a scale-beam and are adapted to reciprocate in a vertical plane, the details of these improvements being hereinafter fully described, and pointed out in the claims.

In the annexed drawings, Figure 1 is a side elevation, showing our meter in its normal or elevated position, one of the posts of the main frame being represented broken. Fig. 2 is a side elevation of the operative parts of the apparatus, the meter being shown depressed and the discharge-gate open. Fig. 3 is a horizontal section of the apparatus, taken immediately above the meter. Fig. 4 is an elevation of the opposite side of the apparatus as seen in Fig. 2, but showing the meter in the same depressed position. Fig. 5 is a vertical section of the apparatus, taken in the plane of the bell-crank, the meter being shown in the same position as seen in Fig. 1. Fig. 6 is an elevation of the lower portion of the meter with the discharge-gate open. Fig. 7 is an enlarged vertical section of the hopper, taken transversely of the supporting-bars of the slide or cut-off; and Fig. 8 represents the preferred method of suspending said hopper from the scale-beam.

A A' A'' represent the vertical posts, and $a$ the horizontal beams, of the main frame of the apparatus, said posts and beams being preferably arranged in the triangular form shown in Fig. 3. Projecting vertically from this frame are standards $a'$, that support the primary or fixed hopper B, whose ventage $b$ is closed with a gate or cut-off, C, having downwardly-projecting flanges or ribs $c\ c'$, that reciprocate between a pair of parallel guide-rods, D D', the latter being suspended beneath said hopper by hangers $d\ d'$. Furthermore, this valve projects beyond the sides of ventage $b$, so as to prevent grain escaping from the hopper and lodging on the rods D D'. (See Fig. 7.)

$a''$ represents a transverse bar connecting the converging beams $a$, said bar being provided with steel or other hard sockets to receive the knife-edged bearings $e\ e'$ of the forked arms E E' of scale-beam F, which beam has one adjustable pea, $f$, to counterbalance the meter and its attachments, and another adjustable pea, $f'$, wherewith to weigh the grain.

The aforesaid meter consists, preferably, of a long rectangular trunk or box, G, which may be suspended from beam E E' F in the manner shown in Fig. 8. Here said meter is shown as provided with a staple, G', to receive a hook, $g$, that engages over a knife-edged bearing, $g'$, of the beam-arm E. Fitted to the upper or receiving end of this meter is a secondary hopper, H, whose ventage $h$ is closed by a valve or cut-off, I, which is guided in a horizontal path by an arrangement of flanges and rods similar to those seen in Fig. 7. Attached externally to this hopper is a suitable brush, $h'$, to sweep the grain off of valve I when the latter is retracted. This valve has a stem, $i$, coupled to the upper arm, J, of a rocking lever pivoted to the side of the meter at $j$, the lower arm, J', of said lever being extended down about as far as the discharge gate or door of the apparatus. Furthermore, this rocking lever has a lug, $j'$, connected by one or more links, $k$, to the upper arm, K, of a forked lever, K K' L, that is pivoted at $l$ to a hanger of the main frame, the lower arm, K', of said lever having applied to its free end an adjustable link, $k'$. M is a spring connecting said link $k'$ to the lug $j'$ of lever J J'.

The principal member L of the forked lever K K' L has a spring, $l'$, attached to a vertically-adjustable rod, N, the stress of said spring serving to maintain the free end of this member L in contact with a stop, $n'$, at the lower end of another vertically-adjustable rod, N'.

Hinged to the lower end of meter G is a discharge gate or door, O, which door is maintained in its closed condition by a catch, P, having a spring, $p$. Q is an adjustable stirrup, against which this catch strikes when the meter has completed its descending stroke.

Adjustably secured to the front and rear sides of the meter are slotted plates R R', having connected to them springs $r\ r'$, whose lower ends are attached at $o\ o'$ to door O, to insure the instant closure of said door at the proper moment. Secured to the under side of this door is a curved bar, S, whose duty will presently appear.

Pivoted to primary hopper B at t is a bell-crank, T T', whose lower arm, T, is coupled to cut-off C, while the other arm, T', of said crank has secured to it a spring, U, which closes, or partially closes, said cut-off at the proper moment, the tension of this spring being regulated by an adjustable bearing, u, as seen in Fig. 5.

The retraction of cut-off C is regulated by a stop, V, adjustable on post W, which latter is provided with a graduated scale, w, to determine the proper set of said stop.

Depending from arm T' is a leg, X, whose foot rests upon a flange at the upper end of the meter, and this leg is made extensible, so as to regulate the motion of bell-crank T T'.

Y is any approved form of counter, operated by arm T', or otherwise. Z is a brush for sweeping grain off of slide C. z is a pad or cushion for the poise f or beam F to rest on.

Our meter is used in the following manner: The poise f is first secured on beam F in such a position as to exactly counterbalance meter G and its attachments, after which act the other poise, f', is set to weigh the amount of grain constituting a single charge of said meter. The apparatus is now ready for service, and in this normal position the various operative parts are disposed as seen in Figs. 1 and 5, a reference to which illustrations will show that valves C and I are open, while the discharge-gate O is closed, the upper valve, C, being kept open by the flange at the top of the meter forcing up the leg X, so as to swing bell-crank T T' on its pivot t. The other valve, I, is kept open by the pull of spring M on lug j' of lever J J', while the stress of spring p swings the catch or latch P, and causes the latter to engage under door O and keep said door closed for the time being. The stream of grain is now let into hopper B from an elevator or other source of supply, and said stream flows past the two open valves C I and speedily fills the meter G, whose closed door O prevents the escape of grain. The accumulation in the meter of a sufficient weight of grain coacts with the tension of springs M and U to overbalance the two peas f f', and the meter now descends until arm T' of the bell-crank T T' comes in contact with stop V, which stop arrests the motion of said crank and relieves the meter from the tension of the upper spring, U. At this moment the links k, above lug j', are drawn taut, (they having been previously regulated by properly adjusting the stop w',) and the spring M and links k being attached to said lug at the same point, they neutralize each other as far as any action on the movement of the meter is concerned. Consequently at this part of the descending stroke of the meter the weight of the grain alone affects the two peas, and when the latter have been fairly overbalanced said meter completes its descending stroke and instantly discharges the contents of the same. During this descent of meter G the scale-beam E E' F turns freely on its knife-edged bearings e e', and as soon as the catch P strikes against the tread of stirrup Q, said catch is at once swung aside, so as to leave door O free to open automatically. Furthermore, this descending stroke of the meter causes lever K K' L to turn on its bearing l, and just previous to the completion of this stroke said lever acts on lug j' in such a manner as to cause the other lever, J J', to close the valve I immediately before gate O is allowed to open. Evidently there can be no further flow of grain from hopper B into the meter proper until said valve I is again opened; but this cannot occur while gate O is open, because the curved bar S of this gate now bears against the lower end of lever J J', that actuates said valve, as seen in Fig. 6. This opening of gate O is, however, but for a moment, as the springs r r' instantly close it as soon as the grain is discharged.

The grain being thus discharged, meter G ascends and swings the lever L into its normal position or against stop w', thereby slackening the links k, and allowing spring M to exert its force in opening the slide I. Immediately on this return of the meter to its normal position the leg X is forced up, so as to completely open the valve C, and the above-described automatic operations are again repeated, each ascent of the meter serving to actuate the counter Y, and thereby register the number of strokes of the apparatus, or otherwise indicate the quantity of grain discharged.

Our apparatus is constructed expressly to weigh a continuous stream of grain, and at no time is the stream entirely closed off in the upper hopper, as it is in the majority of meters.

In order to weigh accurately, the amount, or rather the weight, of grain that runs into the lower chamber of the meter while the lower valve is closing must be the same every time the meter dumps. The necessity of this is evident from the fact that the pea acts like a pendulum, requiring about the same time to pass over the space required to close the valve I regardless of the size of the stream of grain running into the meter. For example, supposing one second of time is required to close said valve I, it is evident a greater or less weight of grain will run into the lower chamber during this second and while the meter is on a balance, according to the size of the stream. Hence, in order to weigh accurately at every dump, the stream of grain must be regulated to exactly the same size at this critical moment.

In order that the machine may be used for all-sized streams, the feed must be set to run as small a stream as possible at this moment, just sufficient to prevent the grain clogging, which is effected by properly graduating the beam F and setting the stop V. To graduate this stop we may use corn, and lower said stop V, so that bell-crank T T' will swing far enough to retract valve C and almost close ventage b, and this position of said stop is indicated on scale w as "Corn." The beam F is then graduated by actual trial in the same manner as any other scale-beam, after which act a stream of wheat is turned into the meter, and on testing the dump it is found it does not correspond with the proper mark on the scale-beam, because wheat is smaller than corn, and, therefore, a greater quantity of it will run into the lower chamber of the meter while valve I is closing. Hence in order to have the dump of wheat correspond with the graduations on the scale-beam it will be necessary to reduce the feed. Accordingly, stop V is lowered yet farther and the feed reduced until the wheat-dump corresponds with the corn-dump, as previously marked on the scale-beam, and this new position of said stop is indicated on scale w as "Wheat," and so on for all other kinds of grain; or the same results may be effected by allowing crank T T' to completely close the valve C and permitting the grain to flow through an opening in said valve, the area of said opening being enlarged or contracted by any approved form of adjustable cut-off on this valve.

The scale-beam F is made inclined, so that when the requisite amount of grain runs into the meter to balance the peas the subsequent movements of the meter are easier and more positive. If a horizontal beam were used the meter would halt in its descending stroke the instant valve I closed, and would require enough grain to run into the hopper H to overcome the tension of spring l'; and the same difficulty would occur when latch P came in contact with stirrup Q—that is to say, said latch would not be sprung until considerably more grain had collected in the aforesaid hopper; but with this inclined beam, when everything is properly adjusted, from the instant valve I begins to close the meter does not stop until it reaches its normal position and is ready for another charge of grain. Consequently, by requiring less time to make the necessary movements, it gives our meter greater capacity.

When the meter has descended to a point where spring M pulls directly against the links k, said spring exerts no influence on the downward motion of the meter, and all that is now necessary is for enough grain to accumulate in the lower chamber and overcome the weight of the peas f f'. When the meter begins to descend below this point the lever K K' L remains stationary, being held against the stop n' by the spring l', and the links k now being taut, the downward movement of said meter closes the valve I. Just here the meter would stop if it were not for the fact that the grain now accumulates in the hopper H above valve I, and also because, owing to the peculiar construction of beam F, the two ends being inclined at different angles, and the meter being thrown farther from the fulcrums e e' has become relatively heavier than the weights f f' during the latter movement, and thus it overcomes the tension of spring l'. When this occurs the lever K K' L turns on its pivot l, and the meter descends until latch P is tripped, as previously described.

We claim as our invention—

1. In a grain-meter, the combination of receptacle G, hopper B b, valve C, bell-crank T T', extension-leg X, spring U, and adjustable stop V, said valve being retracted by the ascent of the receptacle G, as herein described, and for the purpose set forth.

2. In a grain-meter, the discharge-door O, in combination with catch P p, stirrup Q, and self-closing devices R r o R' r' o', as herein described.

3. The combination, in a grain-meter, of valve I, operating-lever J J' j j', and bar S, which bar is applied to discharge-door O, and is adapted to retain valve I in its closed condition while said door is open, as herein described.

4. In combination with grain-meter G and valve I, the lever J J' j j', links k, forked lever K K' L, and stop n', for the purpose herein described and set forth.

5. In a grain-meter, the combination of forked lever K K' L and springs l' M, for the purpose stated.

6. The combination, in a grain-meter, of the adjustable stirrup or tripper Q, for operating the latch P, in the manner described.

7. In combination with sliding valve C, bell-crank T T' t, adjustable stop V, and extension-leg X, the scale w, to indicate the proper position of said stop according to the kind of grain measured, as herein described.

8. In combination with meter G, forked lever K K' k k' L l, and valve-operating lever J J' j j', the adjustable rods N N', spring l', and stop n', for the purpose herein described.

In testimony of which invention we hereunto set our hands.

WILLIAM CARR.
THAD. P. CARR.

Witnesses:
JAMES H. LAYMAN,
JNO. D. HAWKINS.